United States Patent
Jacob et al.

(10) Patent No.: US 10,776,686 B1
(45) Date of Patent: Sep. 15, 2020

(54) CONTAINER ARCHITECTURE FOR MODULAR MACHINE LEARNING

(71) Applicant: ITERATE STUDIO, INC., Denver, CO (US)

(72) Inventors: Shomron Jacob, San Jose, CA (US); Brainerd Sathianathan, Morgan Hill, CA (US); Arulkumaran Chandrasekaran, Tamilnadu (IN); John Selvadurai, San Jose, CA (US); Chatura Samarasinghe, San Jose, CA (US); David Ruvalcaba Gonzalez, San Jose, CA (US)

(73) Assignee: ITERATE STUDIO, INC., Denver, CO (US)

( * ) Notice: Subject to any disclaimer, the term of this patent is extended or adjusted under 35 U.S.C. 154(b) by 0 days.

(21) Appl. No.: 16/692,590

(22) Filed: Nov. 22, 2019

Related U.S. Application Data

(60) Provisional application No. 62/897,490, filed on Sep. 9, 2019.

(51) Int. Cl.
| | |
|---|---|
| *G06N 3/04* | (2006.01) |
| *H04L 12/24* | (2006.01) |
| *G06N 3/08* | (2006.01) |
| *H04L 12/911* | (2013.01) |
| *G06F 3/0486* | (2013.01) |
| *H04L 29/08* | (2006.01) |

(52) U.S. Cl.
CPC ............... *G06N 3/04* (2013.01); *G06N 3/08* (2013.01); *H04L 41/0806* (2013.01); *H04L 47/82* (2013.01); *G06F 3/0486* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,672,355 B2 * | 6/2017 | Titonis | G06F 21/56 |
| 2005/0005261 A1 * | 1/2005 | Severin | G06F 8/316 |
| | | | 717/108 |
| 2008/0028364 A1 * | 1/2008 | Triou | G06F 11/3676 |
| | | | 717/104 |

(Continued)

OTHER PUBLICATIONS

NODE-RED, "User Guide", https://nodered.org/docs/user-guide/ (Accessed Apr. 6, 2020), Apr. 6, 2020, 11 pages.

*Primary Examiner* — Alan Chen
(74) *Attorney, Agent, or Firm* — Dorsey & Whitney LLP

(57) ABSTRACT

The present disclosure relates generally to systems and methods that include a configuration server with a processing element operable to operate a plurality of containers. A plurality of functionality modules are operable to execute within respective containers of the plurality of containers. Each functionality module includes: an input, a functionality operable to be executed by the processing element to perform an artificial intelligence operation using the input, and an output produced by the functionality. The modular system includes a messaging object operable to connect the output of a first one of the plurality of functionality modules to the input of a second of the plurality of functionality modules. The modular system configures the messaging object to adapt the output of first functionality module to the input of the second functionality module.

20 Claims, 6 Drawing Sheets

(56) References Cited

U.S. PATENT DOCUMENTS

| | | | |
|---|---|---|---|
| 2016/0359705 A1* | 12/2016 | Parandehgheibi | ............................ |
| | | | G06F 16/24578 |
| 2017/0148264 A1* | 5/2017 | Pichette | ................. G06Q 30/06 |
| 2018/0052897 A1* | 2/2018 | Namarvar | .............. G06F 8/4452 |
| 2018/0067732 A1* | 3/2018 | Seetharaman | ....... G06F 16/2358 |
| 2019/0228261 A1* | 7/2019 | Chan | .................... G06K 9/6262 |
| 2019/0260782 A1* | 8/2019 | Humphrey | ............ G06F 3/0486 |
| 2019/0361697 A1* | 11/2019 | Hu | ....................... G06F 9/44521 |

* cited by examiner

US 10,776,686 B1

CONTAINER ARCHITECTURE FOR MODULAR MACHINE LEARNING

CROSS-REFERENCE TO RELATED APPLICATIONS

This application claims the benefit of priority of the earlier filing date of U.S. Provisional Patent Application No. 62/897,490 filed 9 Sep. 2019 and entitled "Modular Machine Learning and Artificial Intelligence," which is hereby incorporated by reference in its entirety.

TECHNICAL FIELD

The technology described herein generally relates modular systems and methods for developing and deploying artificial intelligence and machine learning solutions.

BACKGROUND

Artificial intelligence ("AI") and machine learning ("ML") capabilities are increasingly sought to improve computer systems to enable them to perform more tasks in practical applications such as driving business efficiency, finding trends in data, and interacting with customers. Traditionally, developing artificial intelligence solutions required a deep data science engineer with specialized skills and knowledge; a relatively small talent pool. This reliance on a small number of people with the requisite skills and experience can result in limited developments of solutions, delays, and greater cost. Further, once such solutions are deployed, they require the continued attention of a data science engineer to maintain, debug, support, administer, and update such solutions. It is therefore desirable to bring simpler systems and methods of developing, deploying, and maintaining solutions to general engineering audiences.

SUMMARY

A modular system for creating applications is disclosed. The system includes a configuration server with a processing element operable to operate a plurality of containers. A plurality of functionality modules are operable to execute within respective containers of the plurality of containers. Each functionality module includes: an input, a functionality operable to be executed by the processing element to perform an operation using the input, and an output produced by the functionality. The modular system includes a messaging object operable to connect the output of a first one of the plurality of functionality modules to the input of a second of the plurality of functionality modules. The modular system configures the messaging object to adapt the output of the first functionality module to the input of the second functionality module. One of the first functionality module and the second functionality module includes a function to perform an artificial intelligence operation.

A method for generating an executable workflow is provided. A first functionality module is implemented responsive to a user request to add the first functionality module to the executable workflow. The first functionality module is operable to execute within a first container to perform an artificial intelligence operation. A second functionality module is implemented responsive to a user request to add the second functionality module to the executable module. The second functionality module is operable to execute within a second container. A messaging object is configured responsive to a user request to link the first functionality module with the second functionality module. The messaging object is configured to adapt an output of the first functionality module for compatibility with the second functionality module based on a defined relationship between the first functionality module and the second functionality module.

A method for fulfilling a user request is provided. A first input is provided to a first functionality module based on the user request. The first functionality module executes within a first container to perform an artificial intelligence operation to generate a first output. The first output is adapted for input to a second functionality module using a messaging object. The messaging object is configured based on at least one characteristic of the first functionality module and at least one characteristic of the second functionality module. The adapted first output is provided to the second functionality module as a second input. The second functionality module executes within a second container to generate a second output. A response to the user request is communicated using a communication module configured to use a communication input based at least on the second output. The communication module is configured to translate the communication input to the response to the user request.

In addition to the exemplary aspects and embodiments described above, further aspects and embodiments will become apparent by reference to the drawings and by study of the following description.

DETAILED DESCRIPTION

Figure 1:
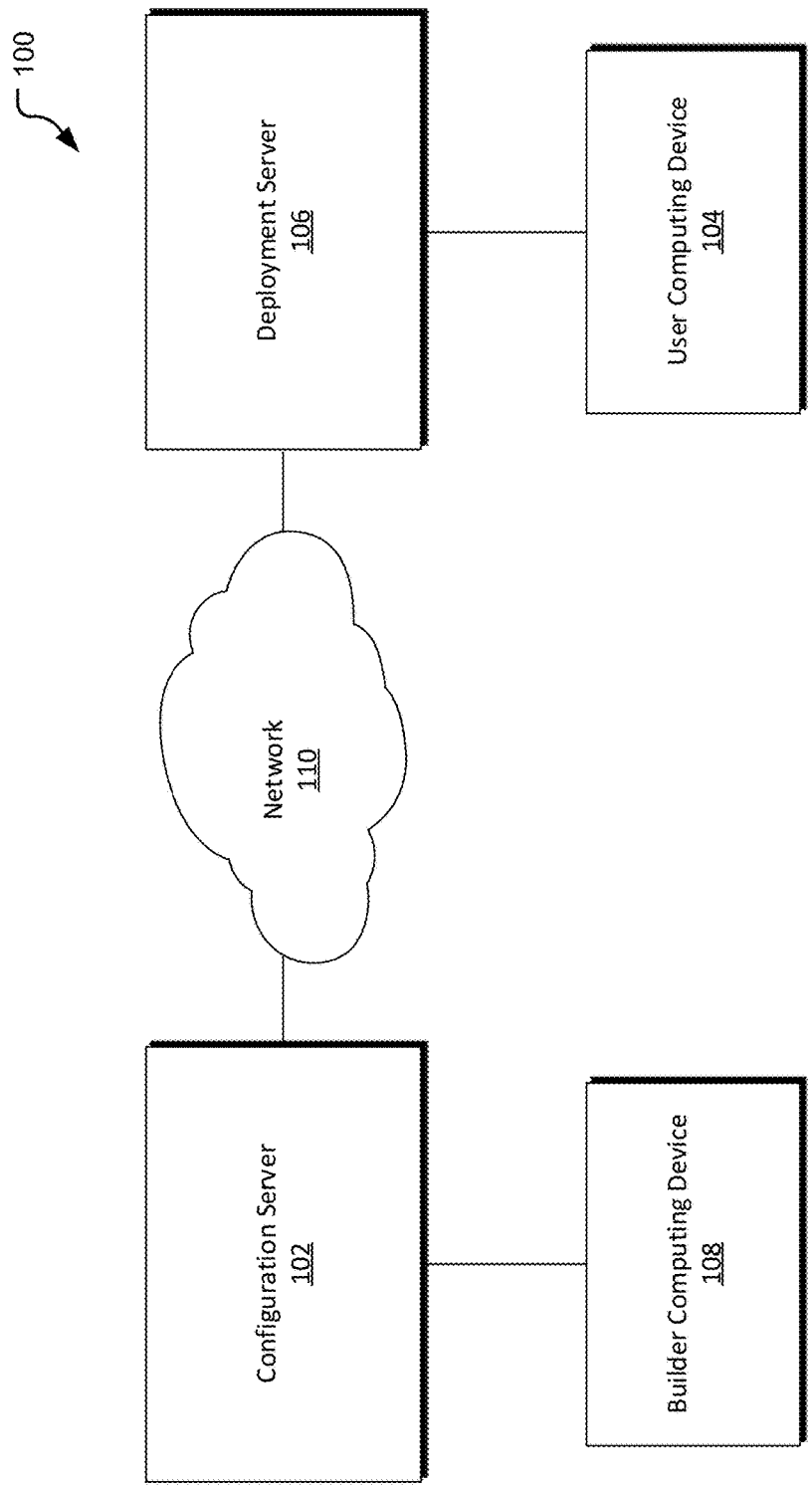
FIG. 1 illustrates a diagram of a modular graphical system that can be used to create and deploy multiplatform based programming packages.

The present disclosure includes systems and methods for developing and deploying artificial intelligence ("AI") and machine learning ("ML") solutions. In one embodiment, the system includes a configuration server that interacts with a user device associated with a user to enable the user to develop and deploy application executables by placing and connecting functionality modules in a drag-and-drop user interface or other type of visual programming interface. The functionality modules define self-contained executable components that receive inputs from other connected functionality modules, execute desired functionality, and may then output data related to the processed inputs to other connected functionality modules. The functionality modules or models are connected so that inputs into a respective module are translated into a desired language, format, or the like, allowing the functionality modules to receive various types of inputs from various other functionality modules, without requiring specialized programming.

Some example executable packages that can be built with the disclosed systems and methods include: AI powered frequently asked question applications, AI/ML powered support for household appliances that provides information such as recalls and how-to-videos, voice enabled purchases, chatbots to interface with customers, confirmation of order status, comparison shopping of products by attribute, and loyalty programs with cryptocurrency rewards.

A user develops solutions by placing functionality modules into a workflow interface, diagram, or visual interface, and connecting the functionality modules to define interactions and data communication therebetween. The system communicates data from the output of a first connected functionality module to the input of a second functionality module. The communication of inputs may be via messaging objects that pass between connected functionality modules to transmit data therebetween. The system automatically configures the communication to match the interface requirements of the functionality modules it connects, such that the functionality modules do not need to be programmed so as to be compatible, while still allowing the interconnection and operability therebetween.

A functionality module receives one or more inputs, executes a determined functionality based on the inputs and may provide one or more outputs. Inputs provided to a functionality module can be data such as numbers, letters, words, uniform resource locators ("URL"), usernames, passwords or other identifying information, queries, images, sounds, video, tactile, vibration, orientation, location, temperature, or other types of information. Inputs can also be events such as a meeting of a condition or the expiration of a timer. Inputs can be user actions such as clicking a link or opening a file, activating a sensor, or the like. Inputs can also be internet information requests or commands such as hypertext transfer protocol ("HTTP"), requests or commands such as POST, GET, and the like.

A functionality module can generate one or more outputs. However, some functionality modules do not generate outputs. Functionality modules can have outputs that are unused in a workflow. Outputs can be inputs to other functionality modules and thus can be similar to the inputs already described.

The functionality of the modules can be varied as needed but generally the modules use the inputs to perform a task or accomplish some result, such as running a programmed functionality, algorithm, or code with the inputs. The functionality of a functionality module can be a computer readable instruction operable to be executed by a processing element such as a central processing unit (CPU) or a graphics processing unit (GPU). The functionality can be executed on more than one processing element. The processing elements can be in a single device such as a server, desktop computer, laptop, and/or personal user device like a phone. The processing elements that execute the functionality of a functionality module can also be distributed across more than one device, such as servers connected in a server system, or servers connected via a network such as the internet, a cell phone network, virtual private network ("VPN"), or other network.

The system allows the connection and communication of multiple functionality modules, so that a user can easily build an integrated and expansive tool that accomplishes a variety of tasks. For example, a functionality module can take an action based on an input, such as authenticating a user's identity given inputs of a username and password. As another example, a functionality module can manipulate the input, such as by producing a vector space from a corpus of text received as an input. Other examples include: performing a calculation based on an input, such as generating an authentication token based on a user's identity, application program interface ("API") that interfaces with a service, function, website, database, or even a company.

In some instances, a functionality module may reconfigure based on an input, such as the case of a functionality module like a neural network that receives and processes training data. Some functionality modules enable enterprises-as-a-service, such as services via an API available from companies like Google, Amazon, Facebook, Salesforce, Linked-in, and Twitter. Other functionality modules enable the use of startups-as-a-service, such as search capabilities from company 1, shipment tracking from company 2, text analysis from company 3, and e-commerce optimization from company 4. Other functionality modules can include AI and/or ML capabilities such as nodes to classify data or objects, textual analysis such as term frequency-inverse document frequency analysis reflecting the importance of a word to a document, decision trees, principal component analysis, multi-layer perceptrons to create artificial neural networks, audio to text transcription, simulated annealing to find an optimal solution to a problem, optical character recognition, a Bayes classifier to classify text into categories, provide sentiment for a user input and categorize the sentiment, support-vector machines to analyze data used for regression analysis and classification, neural classification of strings or images, logistic regression, k-means clustering to cluster data, and/or other AI/ML capabilities. Some functionality modules create recommendations (e.g., product recommendations) based on the similarity between users, or user desires, for example by using a k-nearest neighbors algorithm. For example, such functionality modules can accept parameters such as user identification, data related to an item the user wants to use or purchase, the number of recommendations (e.g., for similar products) that the user wants, and other user options; and outputs results such as recommendations for other products the user may want. Other functionality modules can extract information associated with a user, such as, name, location, email address, phone number, dates, money, and organization (e.g., employer or school) associated with the user. Other functionality modules can filter inputs to determine whether a message is spam or not spam, for example, using a Bayes classifier or other models.

A user can control various inputs, such as choosing which filtering model to use, how to label the resulting categories (e.g., good/bad) and set threshold values. Other functionality modules can find an optimal solution to a given problem, for example, by using a hill climbing algorithm. Other functionality modules can cross validate various classifiers, for example for consistency of results with a given set of inputs. Some functionality modules can supply messaging capabilities for interacting with users. Some functionality modules interface with data services such as databases like mySQL, postgreSQL, Mongodb, and Amazon S3. Other functionality modules provide basic software components such as PUT, GET, and POST messages, HTTP delivery, and email manipulation. Other functionality modules can supply blockchain capabilities, for example to authenticate users and/or transactions.

In some instances, the functionality modules execute their executable function in different operational environments from one another, where the environments may, or may not, be compatible with one another. For example, one functionality module can execute its functionality in a python 2.7 environment, adapted for flexibility. Another functionality module could execute its functionality in a machine language environment, adapted for speed.

The functionality modules can operate in a container or other defined packages, allowing interconnection between non-compatible modules. A container can contain a single functionality module or a container multiple modules. Containers can be physical or hardware defined containers, such as a server, or multiple servers, including one or more processing elements that execute one or more functionality modules. Containers may also be virtual, or a combination of physical and virtual. Virtual containers can be separate threads, executables, memory spaces, consoles, environments, shells, or virtual machines operating on one or more computing devices that execute the functionality of one or more functionality modules.

Returning to the example functionality module using a python 2.7 environment, in this example, the module may provide a functionality of natural language processing ("NLP") to analyze human language data and could execute, for example, in a virtual container like a shell (e.g., a command line interpreter) executing a python 2.7 interpreter on a processing element such as a CPU adapted to execute generalized computer instructions.

Returning to the example of a functionality module adapted to execute its functionality in a machine language environment, that functionality module could provide functionality such as image recognition using a neural network. This functionality could use a large number of parallelized calculations compatible with a physical container such as a server with one or more GPUs with a large number of parallel processing elements. Such functionality could also operate in a virtual container such as a scalable cloud computing service. Containers can be nested, such that a physical container, like a server, can contain one or more virtual containers. Also a virtual container such as a cloud computing resource can contain one or more physical containers, such as servers.

In the systems disclosed herein a processing element can provide an interface to a user, displaying a variety of functionality modules representations, e.g., icons, textual representations, graphical objects, nodes, connecting lines, or the like. The interface can include a graphical interface and the capability to receive user inputs and generate outputs to interact with the user. The interface allows a user to select and place a node. Additionally, through the interface a user can configure connections between different nodes, thereby communicatively connecting different functionality modules. Such connections can be made graphically for instance by clicking and dragging a connector from an output of a node to an input of another node. Such a connector can be represented graphically as a line and can represent a messaging object configured to interface the output of a functionality module to the input of another functionality module.

In one example, a user designs a modular multiplatform based programming package by dragging and dropping nodes, representing functionality modules, into a workflow, and connects the nodes graphically, defining messaging objects between the nodes. The workflow can be deployed by a deployment server, such as a customer server, where other users can interact with the solution deployed to the deployment server with a user device, such as a computer, laptop, tablet, or smart phone.

Turning to FIG. 1, a modular graphical system 100 for developing and deploying multiplatform based programming packages will now be discussed. The system 100 includes one or more configuration servers 102, one or more builder computing devices 108, one or more deployment servers 106, and one or more user computing devices 104. The devices of the system 100 may be in communication with one another via a network 110, which may be any type of data transmission or communication mechanisms or multiple mechanism, such as, but not limited to, WiFi, Bluetooth, Zigbee, wired communications, satellite, other types of radio wave, optical transmission methods, or the like.

The configuration server 102 can generally correspond to a configuring user such as a builder, developer, software provider, application services supplier, or the like, who builds applications for use by users, clients, consumers, or the like. The deployment server 106 may generally correspond to an organization, person, company, vendor or other provider that provides the multiplatform based programming package built by the configuring user. In various embodiments, the configuration server 102 and deployment server 106 can be the same physical or virtual server. In various embodiments the configuring user associated with the configuration server 102 and the provider associated with the deployment server 106 may be the same entity. It should be noted that although only a single device is shown for the category of devices, there may be multiple devices corresponding to the various parties and/or resources, e.g., the servers 102, 106 may include multiple computing resources that may or may not be in communication with one another.

The user computing device 104 and the builder computing device 108 may be substantially any type of electronic device that can receive and transmit data, such as, but not limited to, personal computer, laptop, smartphone, tablet, server, or the like. Similarly, the configuration server 102 and the deployment server 106 may be substantially any type of device that can receive and process information and may be a collection of one or more virtual processing elements (e.g., cloud computing, virtual machines, and the like) in communication with one another.

Figure 2:
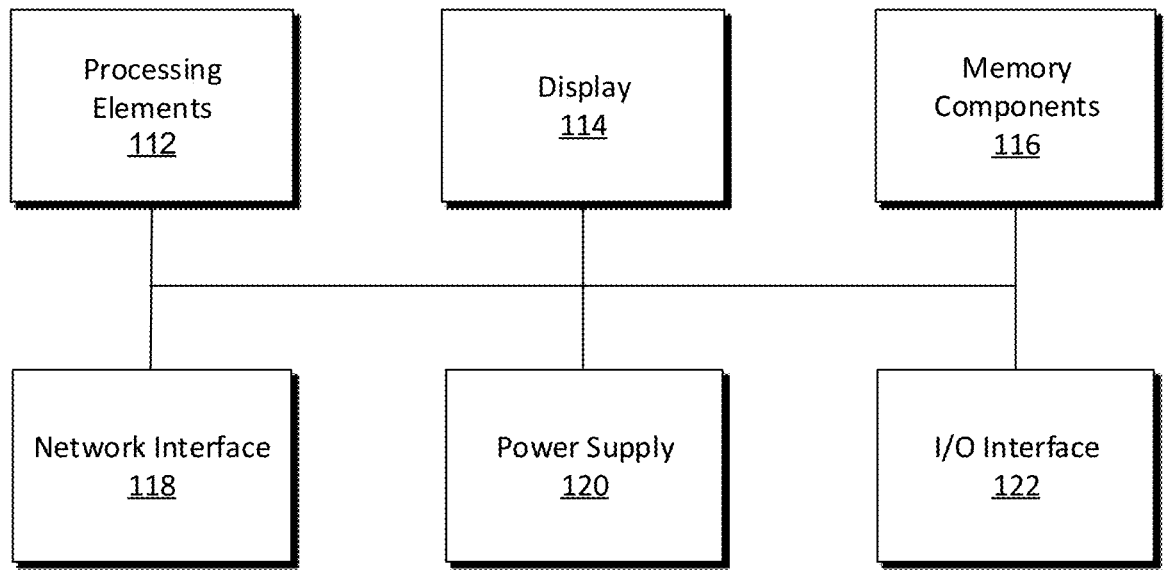
FIG. 2 is a simplified block diagram of an example of computing devices incorporated into the system.

FIG. 2 illustrates a simplified block diagram for the various devices of the system, such as the builder computing device 108 and the user computing device 104. As shown, the various devices may include one or more processing elements 112, a display 114, one or more memory components 116, a network interface 118, optionally power 120, and an input/output interface 122 where the various components may be in direct or indirect communication with one another, such as via one or more system buses, contract traces, wiring, or via wireless mechanisms.

The one or more processing elements 112 may be substantially any electronic device capable of processing, receiving, and/or transmitting instructions. For example, the processing elements 112 may be a microprocessor, microcomputer, graphics processing unit, or the like. It also should be noted that the processing elements 112 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements 112 may be configured to execute one or more instructions in parallel locally, and/or across the network, such as through cloud computing resources.

The display 114 is optional and provides an input/output mechanism for the computing devices, such as to display visual information (e.g., images, graphical user interfaces, videos, notifications, and the like) to the user, and in certain instances may also act to receive user input (e.g., via a touch screen or the like). The display 114 may be a liquid crystal display screen, plasma screen, light emitting diode screen, an organic liquid emitting diode screen, or the like. The type and number of displays may vary with the type of devices (e.g., smartphone versus a desktop computer).

The memory components 116 store electronic data that may be utilized by the computing devices, such as audio files, video files, document files, programming instructions, and the like. The memory components 116 may be, for example, non-volatile storage, a magnetic storage medium, optical storage medium, magneto-optical storage medium, read only memory, random access memory, erasable programmable memory, flash memory, or a combination of one or more types of memory components. In many embodiments, the servers 102, 106 may have a larger memory capacity than the computing devices 104, 108, with the memory components 116 optionally linked via a cloud network or the like.

The network interface 118 receives and transmits data to and from the network 110 to the various computing devices 104, 108 and the servers 102, 106. The network interface 118 may transmit and send data to the network 110 directly or indirectly. For example, the networking interface 118 may transmit data to and from other computing devices through the network 110 which may be a cellular, satellite, or other wireless network (WiFi, WiMAX, Bluetooth) or a wired network (Ethernet), or a combination thereof. In some embodiments, the network interface 118 may also include various modules, such as an API that interfaces and translates requests across the network 110 to the specific local computing elements for the various computing devices 104, 108.

The various computing devices and/or servers 102, 104, 106, 108 may also include a power supply 120. The power supply 120 provides power to various components of the computing devices 102, 104, 106, 108. The power supply 120 may include one or more rechargeable, disposable, or hardwire sources, e.g., batteries, power cord, AC/DC inverter, DC/DC converter, or the like. Additionally, the power supply 120 may include one or more types of connectors or components that provide different types of power to the computing devices and/or servers 102, 104, 106, 108. In some embodiments, the power supply 120 may include a connector (such as a universal serial bus) that provides power to the device or batteries within the device and also transmits data to and from the device to other devices.

The input/output interface 122 allows the computing devices and/or servers 102, 104, 106, 108 to receive input from a user and provide output to the user. For example, the input/output interface 122 may include a capacitive touch screen, keyboard, mouse, stylus, or the like. The type of devices that interact via the input/output interface 122 may be varied as desired. It should be noted that the various computing devices may be in communication with a compute back end, such as the server 106 or a cloud provider, e.g., Google Cloud Platform, Amazon Web Services, Microsoft Azure, or the like.

Figure 3:
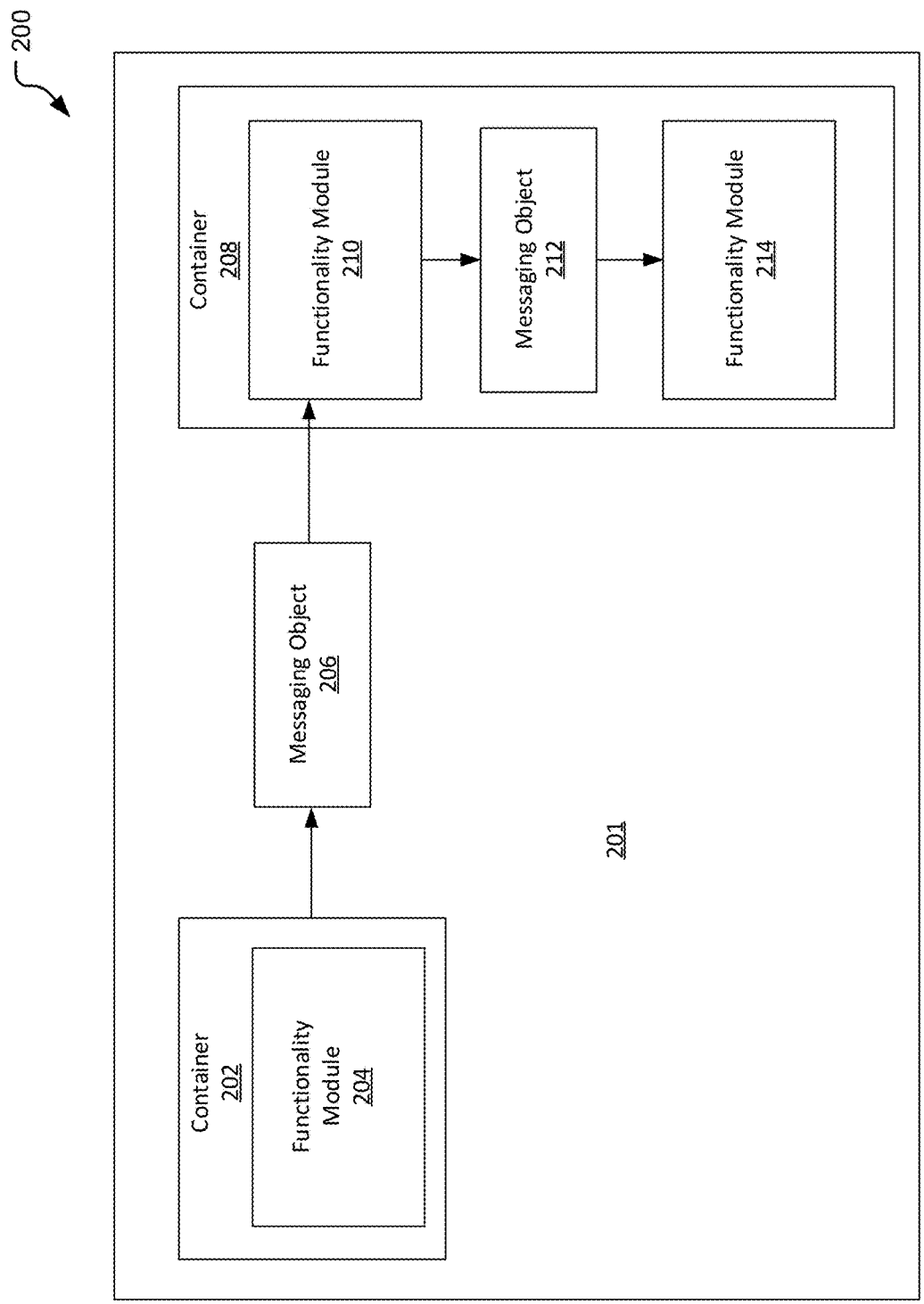
FIG. 3 is a flow chart illustrating part of an example of a workflow created with the modular system of FIG. 1.

FIG. 3 illustrates a specific example of an AI/ML defined workflow 200, programmed by coupling functionality modules, represented by nodes, within a workflow interface 201 and connecting them with messaging objects. The workflow 200 may define a multiplatform based programming package or process that can be deployed for use, such as on the deployment server 106, or other server. The package defined by the workflow 200 executes a first functionality module 204 that generates one or more outputs. The outputs of the first functionality module 204 are translated and passed by a messaging object 206, to the input of a second functionality module 210. The second functionality module 210 executes a second functionality using the output from the first functionality module 204. The second functionality module 210 generates one or more outputs, which are translated and passed by a second messaging object 212, to a third functionality module 214. The third functionality module 214 executes a functionality using the output from the preceding functionality modules, and may also generate one or more outputs. The functionality modules that execute may utilize the inputs to complete an analysis or other function, such as an AI/ML analysis, where the output of which is then provided to the next module for use as an input, which allows a user to easily incorporate and exploit AI/ML functionality.

In a specific example, the multiplatform based programming package defined by the workflow 200 executes a website that monitors user inputs and processes them through an NLP module to determine the topic to which a user's question relates. The package can then search for related subject matter and return related results to the user. In the example of FIG. 3, the FAQ is adapted to interface with a user such as a customer of a business with both online and outlet stores. The workflow includes a first container 202, that contains a first functionality module 204. The workflow 200 also contains a second container 208 that contains a second functionality module 210 and a third functionality module 214.

In the FIG. 3 example, the first container 202 is a virtual container executing a first environment, e.g., a python 3.7 interpreter. The first functionality module 204 within the first container 202 provides a first AI/ML functionality, e.g., NLP (also called natural language understanding or "NLU") functionality. The first functionality module 204 receives as an input a user query and converts the query into another form using the AI/ML framework. For example, the first functionality module 204 can convert the query into structured data with a high degree of organization or with a defined schema, such as a relational database. The first functionality module 204 can also convert the query into semi-structured data that does not have a pre-defined data model, or schema, or is not organized in a pre-defined manner, yet has some level or organization of the information such as in a hierarchy, categories, or groups of data.

As some examples of the conversion via the first functionality module 204, a user can start a conversation with a customer service chat function or bot by inputting a query such as, "Can I purchase gift cards on your website or in an outlet store?" Such a query can be received by a functionality module adapted to receive user queries and passed into the input of the first functionality module 204 (e.g., via the messaging object). In the example shown in FIG. 3, the first functionality module 204 converts the query text received from the first module into semi-structured data in a format such as JavaScript object notation ("JSON"), extensible markup language ("XML"), or the like. For example, the first functionality module 204 could output a JSON string such as, "{"intent": "buy_gift_card", "entities": {"location": {"website", "outlet"} } }," representing the input query in a semi-structured data format. In this example, the functionality module 204 interpreted the query text to determine that the user intends to buy a gift card, from either the company's website or an outlet store.

The first functionality module 204 could accomplish this functionality by using an AI/ML framework selected from among applicable AI/ML frameworks. Such frameworks could execute in a variety of operational environments, such as in machine language environments, interpreted environments, or scripted environments. The first container 202 can be selected to provide an appropriate environment for a selected AI/ML framework. In a specific example, an AI/ML framework providing the functionality of the first functionality module 204 could be a python package. More specifically, the AI/ML framework could be a package that runs in a python 3.7 interpreter or other environment and the first container 202 is selected to then define or provide a python 3.7 interpreter as the operating environment.

Generally, AI/ML functionality modules, such as the functionality module 204, should be trained to provide more accurate or meaningful results. In this manner, an input to the functionality module 204 can be a set of training data including natural language text queries from users and corresponding structured or semi-structured data resulting from analysis of that data. For example, the training data could be compiled from a list of frequently asked questions. The training data can be provided as a file, list, database, or other suitable format. Utilizing a set of queries and structured or semi-structured results can train the AI/ML of the functionality module 204 to recognize similar queries and parse them into structured or semi-structured data. The functionality module 204 can also accept a number of tuning parameters on its input as well, that can help customize and tailor the analysis of the queries. Tuning parameters can be used to set up or change the behavior of AI/ML functionality. In some specific examples, tuning parameters can optimize the inputs or outputs of neural or machine learning networks. Tuning parameters can change the learning rate of an AI/ML functionality, for example by changing the amount of learning from data received. Tuning parameters can change the error tolerance of an AI/ML functionality. Tuning parameters can also affect the weight or weight function of perceptrons in a neural network. In examples where an AI/ML functionality is a non-neural algorithm, the tuning parameters can affect support vectors. Additionally, the functionality module 204 can continually train itself as it is deployed to provide more meaningful results.

The system 100 connects various functionality modules using messaging objects (e.g., the first messaging object 206). Messaging objects pass information from the output of one or more functionality modules to other functionality modules. A messaging object can be structured data in a database or semi-structured data in a format such as JSON or XML. A messaging object can have any set of properties desired to connect two functionality modules. In a preferred embodiment, a messaging object has a payload property representing the data being passed between functionality modules. A messaging object can also have a property such as a messaging identifier or ID that can be used to track the messaging object as it passes through a workflow. In the example of FIG. 3, the semi-structured data output from the first functionality module 204 can be passed to the input of the second functionality module 210 by first a messaging object 206. In the above example, the first messaging object 206 could have a payload property containing the JSON string, "{"intent": "buy_gift_card", "entities": {"location": {"website", "outlet"}}}." The first messaging object 206 could also have an ID such as "1234", that identifies the first messaging object 206 within the workflow 200. The first messaging object 206 can pass into the input of the second functionality module 210. The system 100 can configure a messaging object, such as the first messaging object 206 to connect to disparate functionality modules, such as between the first functionality module 204 and the second functionality module 210.

In this example, the second container 208 is a virtual container executing a second operating environment, e.g., a JavaScript interpreter. The second container 208 contains both the second and third functionality modules 210 and 214. The second container 208 could be, for example, a server side JavaScript engine running on a deployment server 106, a client side JavaScript engine embedded in a web browser on a user computing device 104, or another virtual or physical container. Because the second functionality module 210 is contained in the second container 208, it uses JavaScript to provide its functionality.

In this example, the second functionality module 210 is a script in JavaScript format adapted to parse the JSON data received from the first functionality module 204 on its input. However, the second functionality module 210 can implement any kind of JavaScript code or framework to operate on the first messaging object 206 passed into its input. In this example, the second functionality module 210 parses the JSON data and converts it to a query suitable to input into a search engine. The second functionality module 210 then passes the query, using a second messaging object 212, to the third functionality module 214. The second functionality module 210 could also modify the payload of the first messaging object 206 and pass it on to the third functionality module 214. Also, the second functionality 210 module can pass an array of messaging objects on its output, to one or more other functionality modules. The second functionality module 210 can also pass log messages, errors, or warnings to aide in debugging of a multiplatform based programming package developed using the system 100.

In the workflow 200, the third functionality module 214 has the functionality of interfacing with an API of a third-party search provider, separate from the system 100. The third functionality module 214 receives the search query from the second functionality module 210 on its input, via the second messaging object 212, sends the query to the third-party provider, and receives the search results. The third functionality module 214 can implement an API identifier and license key to identify to the third-party provider that the search is originating from the package defined by the workflow 200. The third functionality module 214 can also identify a pre-compiled index of search results against which to check the query (e.g., to increase the speed at which results are returned). The third functionality module 214, in this example, can implement its functionality in a JavaScript environment, and is suitable for residing in the container 208 also containing the second functionality module 210. The third functionality module 214 can output the search results returned from the third-party search provider to other functionality modules, such as via the payload object of a messaging function passed in its output. The third functionality module 214 can adapt, format, or further modify the results, or send to other functionality modules, ultimately to a functionality module that displays the results to the user, for example, by generating HTML for display by a web browser on a user device 104.

As can be understood, a messaging object is highly flexible and able to connect disparate functionality modules executing in different containers and thus different environments. The system 100 configures the messaging objects 206, 212 to adapt their data, payloads, and interfaces to match the format and data needs of the inputs and outputs of the various functionality modules deployed in a workflow 200. This flexibility of messaging objects allows the system 100 to include functionality modules of many different types, operating in different containers into a seamless multiplatform based programming package.

Figure 4:
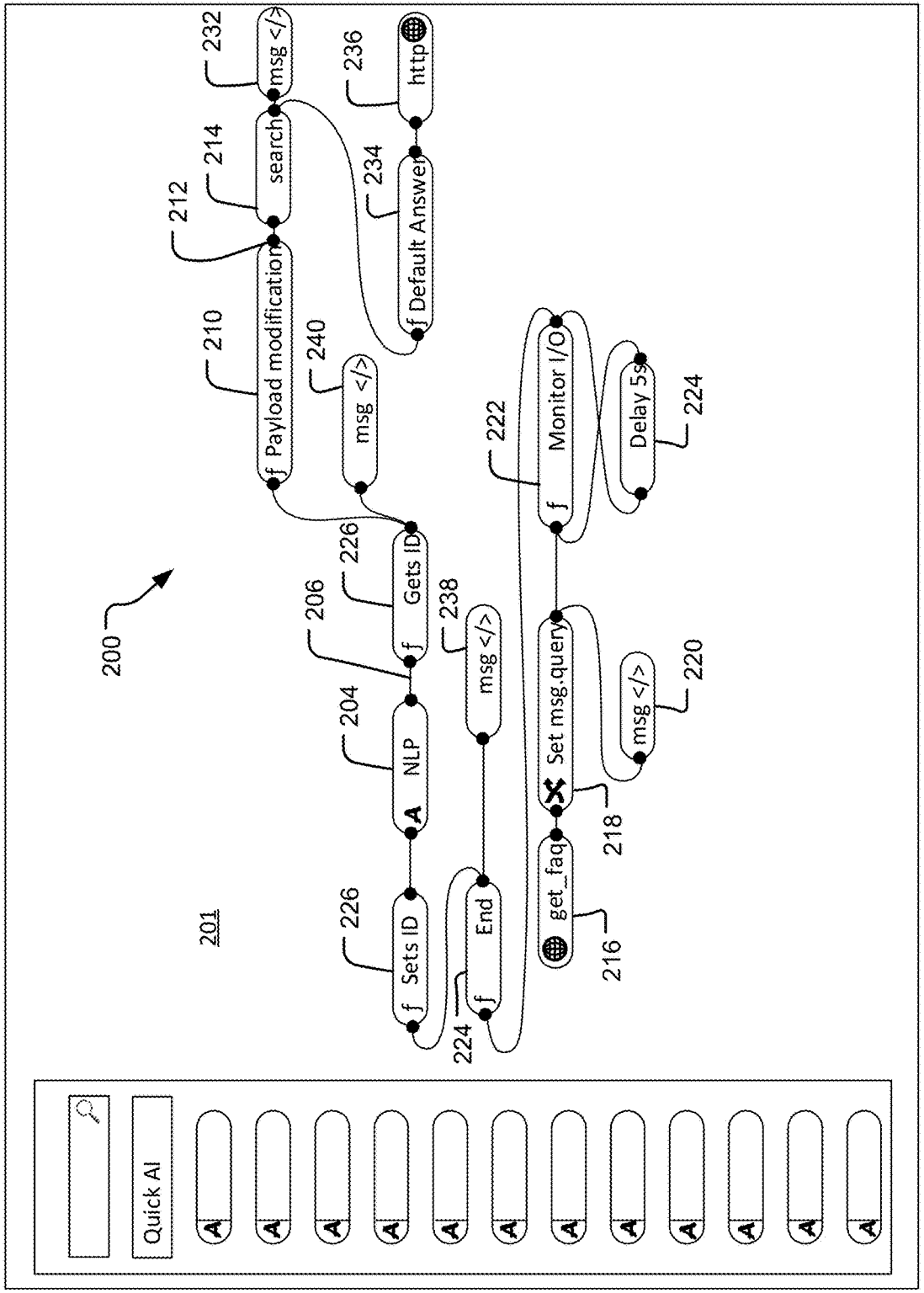
FIG. 4 is a flow chart illustrating an example of a workflow created with the modular system of FIG. 1, with additional functionality modules.

FIG. 4 illustrates another example of a completed workflow 200 that can be built and executed via the system 100 or deployed as a multiplatform based programming package or process. The functionality modules 204, 210, 214 can be as discussed above. Other examples of functionality modules can be similar to those already discussed, and implement the following functionality. Functionality module 216 implements an HTTP GET request, requesting an FAQ data set to train the functionality module 204. Some functionality modules, which can use different and otherwise incompatible software and/or hardware environments, can operate within virtual containers on a server or on multiple servers. Functionality module 218 can set a user's search query in the payload of a messaging object. Functionality module 222 can monitor the user input to provide results as the user types. Functionality module 224 can implement a delay for the first request on the search engine of functionality module 214, to allow the user to type a meaningful amount of the query for an initial search. Functionality module 226 can set an ID for the messaging object 206. Similarly, functionality module 228 can retrieve the ID of the messaging object 206. Functionality module 234 can further manipulate the search results received from the third-party search provider whose API is interfaced via the functionality module 214, for example using JavaScript code to provide response logic, filtering, and error handling. Functionality module 236 can output the search results to the user by generating HTML code for display on a user device 104. Functionality module 224 can end the workflow 200. Functionality modules 220, 232, 238, and 240 are optional debug messaging functionality modules.

Figure 5:
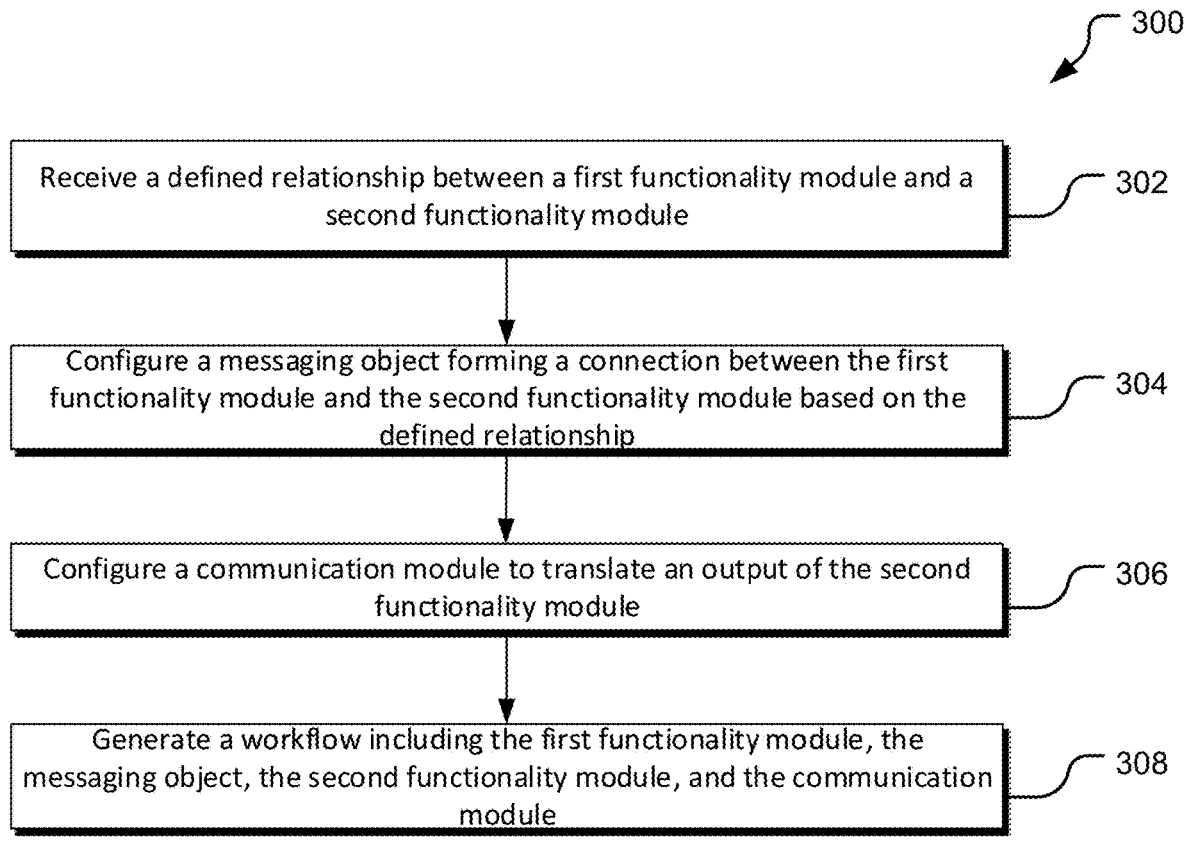
FIG. 5 is a flow chart illustrating a method of building a multiplatform based programming package, using the system of FIG. 1.

FIG. 5 illustrates a method 300 of building a multiplatform based programming package, like the solutions described for example, in FIGS. 3 and 4. The method 300 can be executed by a processing unit on a server, such as the configuration server 102, or processing units on other computing devices. The operations of the method 300 may be performed in alternative order from that presented without deviating from the present disclosure.

The method 300 may begin in operation 302 and the configuration server 102 receives a defined relationship between a first functionality module and a second functionality module. For example, the configuration server 102 may receive information regarding the data inputs and outputs of various functionality modules, as well as their formats, and operating environments. For instance, returning to the examples of FIGS. 3 and 4, the configuration server 102 may receive configuration information for the functionality module 204 indicating that its input needs a natural text query, training data, and tuning parameters, and that its output is a structured or semi-structured data set. For example, a user can define connections between functionality modules in the workflow 200 using the workflow interface 201 by connecting functionality modules with connectors or lines. Likewise, the configuration server 102 may receive configuration information that the functionality module 210 takes a structured or semi-structured data set as its input and parses that data set into an object compatible with a third-party search engine. Other relationships between other functionality modules can be similarly configured.

The method may proceed to operation 304 and the configuration server 102 may configure a messaging object forming a connection between the first functionality module and the second functionality module based on the defined relationship. For instance, the configuration server 102 can configure a messaging object to pass the output from the functionality module 204 to the functionality module 210. The configuration server 102 can accomplish this configuration by using the defined relationships between functionality modules received in operation 302 to add or remove properties from messaging objects passing between the various functionality modules. A messaging object can be readable by the functionality modules to which it is connected. When functionality modules are connected by a messaging object, the functionality modules can be aware of the other functionality modules to which they are connected. For example, a functionality module whose output or input is connected to a messaging object can perform a scan to determine what other functionality modules are connected and change parameters in the messaging object accordingly. If a functionality modules whose output is connected to a messaging object (a sending functionality module) that has an established configuration for a messaging object, it can configure the messaging object accordingly. Functionality modules can also dynamically determine the appropriate configuration of a messaging object based on rules that determine how to configure connected functionality modules.

The method 300 may then proceed to operation 306 and the configuration server 102 configures a functionality module to translate an output of the second functionality module. For example, the configuration server 102 can translate the output of raw search results from the functionality module 214, by applying filtering and error handling logic as in the functionality module 234, for use by the functionality module 236 to display results to a user.

The method 300 may proceed to operation 308 and the configuration server 102 generates a workflow or process flow 200 including the first functionality module, the messaging object, the second functionality module, and the communication module. The work flow or process flow 200 may be executed for example by a deployment server 106. The configuration server 102 can assemble the defined relationships, the configured connections and outputs of the various functionality modules to create a multiplatform based programming package or process defined by the workflow 200. The configuration server 102, in operation 308, can also set up or implement the various containers needed to contain the functionality modules. For example, the configuration server 102 could configure instances of python and/or JavaScript interpreters to execute the functionality modules 204 and 210, 214, respectively.

Figure 6:
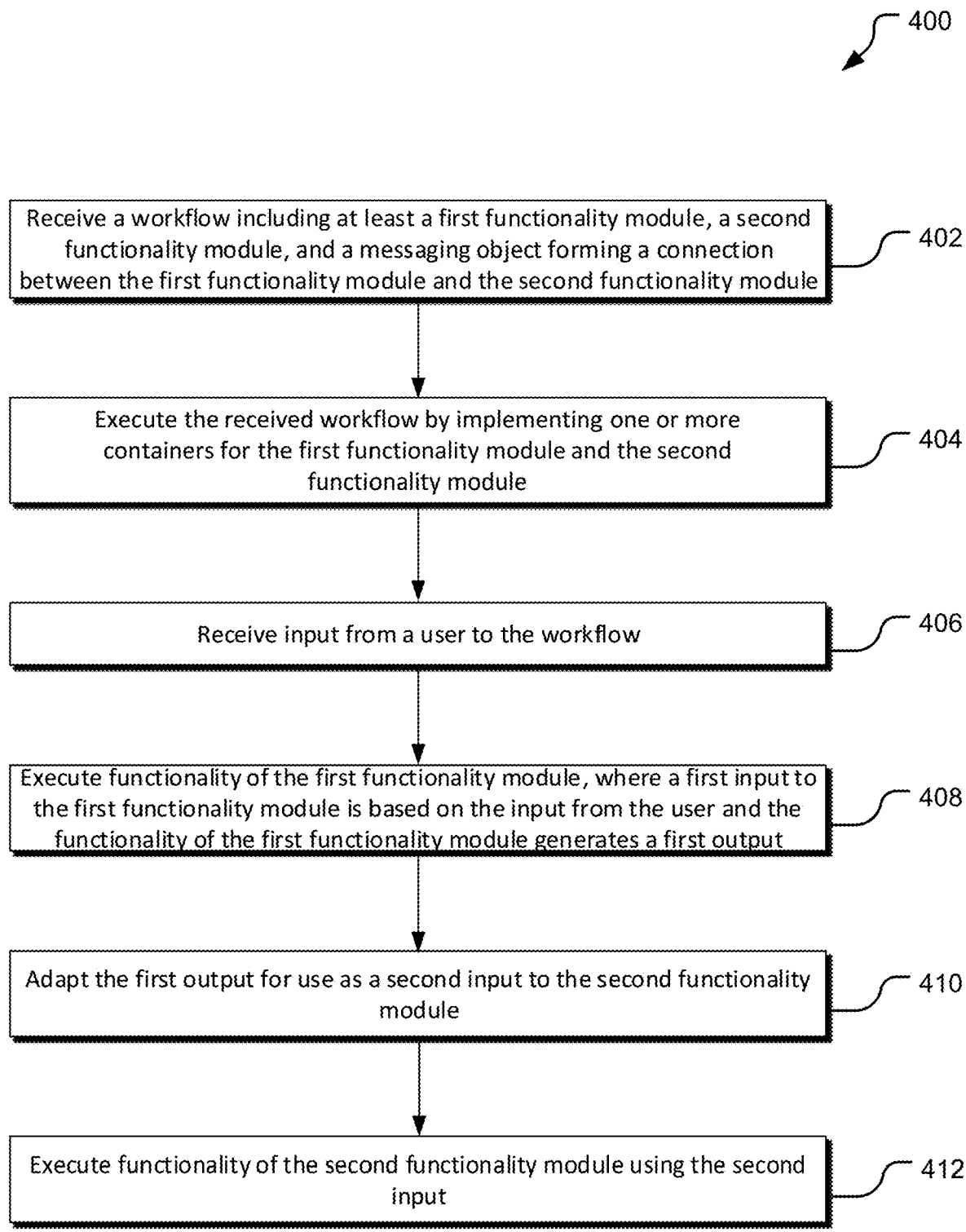
FIG. 6 is a flow chart illustrating a method of deploying a multiplatform based programming package, using the system of FIG. 1.

FIG. 6 illustrates a method 400 of deploying a multiplatform based programming package, like the solutions described for example, in FIGS. 3 and 4. The method 400 can be executed by a processing unit on a server, such as the deployment server 102, or processing units on other computing devices. The operations of the method 400 may be performed in different orders than those presented without deviating from the present disclosure.

The method 400 may begin with operation 402 and the deployment server 106 receives a workflow 200. The workflow 200 may include a first functionality module, a second functionality module, and a messaging object forming a connection between the first functionality module and the second functionality module. The deployment server 106 may receive a workflow from a configuration server 102. The workflow may be the output of the method 300, and may contain the defined relationships between functionality modules. The workflow may contain the configurations of the connections between functionality modules, as represented, for example by the messaging objects 206 and 212 within the workflow or process 200.

The method 400 may then proceed to operation 404 and the deployment server 106 can execute the workflow received in operation 402. As part of operation 404, the deployment server 106 can set up and operate various virtual or physical containers to contain the functionality modules. Generally, functionality modules compatible with different interpreters will operate in different containers. To execute a received workflow including the first functionality module and the second functionality module, the deployment server 106 may implement a first container for the first functionality module and a second container for the second functionality module. For instance, the deployment server 106 may set up instances of python or JavaScript interpreters, or others, as previously described, to contain the functionality modules 204, 210, and 214, respectively, or other functionality modules. In some instances, where functionality modules are compatible with the same interpreter, the deployment server 106 may set up one virtual or physical container for multiple functionality modules.

The method 400 may then proceed to operation 406 and the deployment server 106 may receive an input from a user device 104 that may be an input to the workflow 200. The input may be, for example, text input, audio input, or input received through a graphical interface (such as a user selecting an icon corresponding to an input option). For example, the deployment server 106 can monitor the functionality module 218 of FIG. 4 for input related to a user FAQ search. The deployment server 106 can then pass that input to another functionality module, such as functionality module 204.

The method 400 may then proceed to operation 408 and the deployment server 106 executes the functionality of the first functionality module. For example, the deployment server 106 can execute the functionality of the functionality module 204, in a python 3.7 container, to perform NLP analysis of the user FAQ search to generate a first output. The deployment server 106 may execute the functionality of the first functionality module using available interpreters. The deployment server 106 may use available interpreters in conjunction with additional modules or libraries to handle allocation of tasks associated with a functionality module. For example, the resource based multithreading module disclosed in the U.S. Pat. No. 16/692,941 entitled "Developer Independent Resource Based Multithreading Module," may be used in conjunction with a node.js execution environment to allocate execution of computationally intensive tasks among available processors.

The method may proceed to operation 410 and the deployment server 106 adapts the first output for use as a second input to the second functionality module. The deployment server 106 adapts the first output by executing a messaging object configured to pass information from the first functionality module to the second functionality module.

The method 400 may then proceed to operation 412 and the deployment server 106 executes functionality of the second functionality module using the second input. The deployment server 106 may then repeat operations 410 and 412 for remaining functionality modules and messaging objects in the workflow. Returning to the workflow 200 in FIG. 4, the deployment server 106 may execute the functionality of functionality modules 210-236, using messaging objects connecting functionality modules to format communications between functionality modules.

The method 400 may terminate, for example, once an output is delivered. Returning to the examples of FIGS. 3-4, configuration server 102 can generate raw search results from a functionality module, such as the functionality module 214. The deployment server 106 can also generate output from functionality module 236 to display final search results to a user via the user device 104.

The foregoing description, for purposes of explanation, uses specific nomenclature to provide a thorough understanding of the described embodiments. However, it will be apparent to one skilled in the art that the specific details are not required to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A modular system for creating applications comprising:
a configuration server with a processing element operable to implement a plurality of containers;
a plurality of functionality modules operable to execute within respective containers of the plurality of containers, each functionality module having:
an input,
a functionality operable to be executed by the processing element to perform an operation using the input, and
an output produced by the functionality; and
a messaging object operable to connect the output of a first one of the plurality of functionality modules to the input of a second of the plurality of functionality modules, wherein:
the modular system configures the messaging object to adapt the output of the first functionality module executing in a first operating environment to the input of the second functionality module executing in a second operating environment different from the first operating environment by translating the output of the first functionality module to a format operable with the second operating environment to provide the input of the second functionality module, and
one of the first functionality module and the second functionality module includes a function to perform an artificial intelligence operation.

2. The modular system of claim 1, wherein a first one of the plurality of containers executes machine readable instructions incompatible with a second one of the plurality of containers.

3. The modular system of claim 2, wherein the first one of the plurality of containers comprises an interpreter executing the first operating environment with the first functionality module and the second one of the plurality of containers comprises an interpreter executing the second operating environment with the second functionality module.

4. The modular system of claim 1, wherein the modular system configures the messaging object by adapting interfaces of the messaging object based on the output of the first functionality module and the input of the second functionality module.

5. The modular system of claim 1, wherein the modular system configures the messaging object based on a defined relationship between the first functionality module and the second functionality module.

6. The modular system of claim 1, wherein the modular system further comprises:
a communication module operable to communicate the output of a workflow including the first functionality module, the second functionality module, and the messaging object to a user when the workflow is executed.

7. The modular system of claim 6, wherein the modular system configures the communication module to adapt a workflow output based on the output of the second functionality module for communication to the user.

8. The modular system of claim 1, wherein the artificial intelligence or machine learning operation includes an artificial neural network.

9. A method for generating an executable workflow comprising:
implementing, responsive to a user request to add a first functionality module to the executable workflow, the first functionality module operable to execute within a first container and a first operating environment to perform an artificial intelligence operation;
implementing, responsive to a user request to add a second functionality module to the executable workflow, the second functionality module operable to execute within a second container and a second operating environment incompatible with the first operating environment; and
configuring, responsive to a user request to link the first functionality module with the second functionality module, a messaging object by adapting interfaces of the messaging object to translate an output of the first functionality module for compatibility with the second functionality module based on a defined relationship between the first functionality module and the second functionality module.

10. The method of claim 9, further comprising:
configuring, in response to a user request to add a communication module to communicate an output of the workflow to an end user, the communication module to format the output of the workflow for presentation to the end user through a graphical interface.

11. The method of claim 9, further comprising:
configuring, in response to a user request to add a communication module to communicate an output of the workflow to an end user, the communication module to format the output of the workflow for presentation to the end user through an audio interface.

12. The method of claim 9, further comprising:
generating a workflow including the first functionality module, the second functionality module and the messaging object.

13. The method of claim 12, wherein generating the workflow comprises:
implementing the first container to execute the first functionality module; and
implementing the second container to execute the second functionality module.

14. The method of claim 13, wherein implementing the first container comprises configuring an instance of a first interpreter executing the first operating environment within the first container.

15. The method of claim 14, wherein implementing the second container comprises configuring an instance of a second interpreter executing the second operating environment within the second container.

16. The method of claim 9, wherein the defined relationship between the first functionality module and the second functionality module is defined based on a first interpreter of the first functionality module and the second interpreter of the second functionality module.

17. The method of claim 16, wherein the defined relationship between the first functionality module and the second functionality module is further defined based on the output of the first functionality and an input of the second functionality module.

18. A method for fulfilling a user request comprising:
providing a first input based on the user request to a first functionality module executing within a first container and a first operating environment to perform an artificial intelligence operation to generate a first output;
adapt the first output for input to a second functionality module using a messaging object configured based on at least one characteristic of the first functionality module and at least one characteristic of the second functionality module;
providing the adapted first output to the second functionality module as a second input, wherein the second functionality module executes within a second container and a second operating environment incompatible with the first operating environment to generate a second output; and
communicate a response to the user request using a communication module configured to use a communication input based at least on the second output, wherein the communication module is configured to translate the communication input to the response to the user request.

19. The method of claim 18, wherein providing the first input to the first functionality module further comprises configuring an instance of a first interpreter executing the first operating environment to execute the first functionality module.

20. The method of claim 19, wherein providing the adapted first output to the second functionality module further comprises configuring an instance of a second interpreter executing the second operating environment.

* * * * *